US011743212B2

(12) United States Patent
Truong et al.

(10) Patent No.: US 11,743,212 B2
(45) Date of Patent: *Aug. 29, 2023

(54) VIRTUAL-ASSISTANT-BASED RESOLUTION OF USER INQUIRIES VIA FAILURE-TRIGGERED DOCUMENT PRESENTATION

(71) Applicant: Capital One Services, LLC, McLean, VA (US)

(72) Inventors: Anh Truong, Champaign, IL (US); Austin Walters, Savoy, IL (US)

(73) Assignee: Capital One Services, LLC, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/849,902

(22) Filed: Jun. 27, 2022

(65) Prior Publication Data

US 2022/0329546 A1 Oct. 13, 2022

Related U.S. Application Data

(63) Continuation of application No. 17/118,478, filed on Dec. 10, 2020, now Pat. No. 11,405,338.

(51) Int. Cl.
*H04L 51/02* (2022.01)
*G06F 40/30* (2020.01)
(Continued)

(52) U.S. Cl.
CPC .............. *H04L 51/02* (2013.01); *G06F 3/167* (2013.01); *G06F 40/30* (2020.01); *G06N 3/02* (2013.01); *H04L 51/046* (2013.01)

(58) Field of Classification Search
CPC ....... H04L 51/02; H04L 51/046; G06F 40/30; G06F 3/167; G06N 3/02
See application file for complete search history.

(56) References Cited

U.S. PATENT DOCUMENTS 11,405,338 B2 * 8/2022 Truong ................. H04L 51/046
2012/0278341 A1 * 11/2012 Ogilvy ................... G06Q 10/00
707/748

(Continued)

OTHER PUBLICATIONS

Daltayanni, Maria, Chunye Wang, and Ram Akella. "A fast interactive search system for healthcare services." 2012 Annual SRII Global Conference. IEEE, 2012. (Year: 2012).*

*Primary Examiner* — Soe Hlaing
(74) *Attorney, Agent, or Firm* — Perkins Coie LLP

(57) ABSTRACT

In certain embodiments, document-based resolution of user inquiries may be facilitated. A predicted intent of the user is determined based on chat activity information associated with the user. A response to a user inquiry may be provided to the user via a chat interface based on the predicted intent. User response may be obtained for the response, which may indicate a failure in providing a resolution to the user (e.g., regarding a user inquiry). Upon detecting a failure in providing the resolution, a document associated with the user and matching the predicted intent may be obtained and presented to via the chat interface. The document may have content related to the predicted intent. The document may be presented as a response to the user response to seek a confirmation from the user regarding its relevance to the user inquiry.

20 Claims, 6 Drawing Sheets

(51) Int. Cl.
*G06F 3/16* (2006.01)
*G06N 3/02* (2006.01)
*H04L 51/046* (2022.01)

(56) References Cited

U.S. PATENT DOCUMENTS

2018/0077088 A1* 3/2018 Cabrera-Cordon ......................... G06F 16/90335
2020/0259891 A1* 8/2020 Abraham ............ H04L 67/1008

* cited by examiner

VIRTUAL-ASSISTANT-BASED RESOLUTION OF USER INQUIRIES VIA FAILURE-TRIGGERED DOCUMENT PRESENTATION

CROSS-REFERENCE TO RELATED APPLICATION(S)

This application is a continuation of U.S. patent application Ser. No. 17/118,478, filed Dec. 10, 2020. The content of the foregoing application is incorporated herein in its entirety by reference.

TECHNICAL FIELD

The invention relates to conversational artificial intelligence, including, for example, providing resolution of user inquiries via document presentation.

BACKGROUND

Chatbots (e.g., a form of automated conversational artificial intelligence or virtual assistant) enable a human user to message or chat with a computer that "talks" like a human and, in some instances, get answers without necessitating human interaction or independent searches by the user. For example, a chatbot may obtain context from the questions submitted by the user or answers (or other comments) provided by the user during a chat session and then propose solutions or answers to the user. Often, however, the chatbot may not understand what the user is asking, the user may not know how to phrase questions to the chatbot, or the user may not be satisfied with the response from the chatbot which causes friction with respect to the user's interactions with a chatbot service.

SUMMARY

Aspects of the invention relate to methods, apparatuses, and/or systems for facilitating virtual-assistant-based resolution of user inquiries via document presentation, or training or configuration of neural networks or other prediction models to facilitate virtual-assistant-based resolution of user inquiries via document presentation.

In some embodiments, chat activity information associated with the user may be provided to a prediction model to obtain a predicted intent of the user. A response to a user inquiry may be provided to the user via a chat interface based on the predicted intent. User input may be obtained for the response, which may indicate a failure in providing a resolution to the user (e.g., regarding a user inquiry). In some embodiments, upon detecting a failure in providing the resolution, a document associated with the user may be obtained from the prediction model based on the predicted intent and presented to the user via the chat interface. The document may have content related to the predicted intent. The document may be presented to seek a confirmation from the user regarding its relevance to the user inquiry. In this way, for example, the user is able to clarify or better express the inquiry, or the virtual assistant is able to better understand the inquiry, and the inquiry may be resolved with the user experiencing minimal to no friction with the virtual assistant.

In some embodiments, the document may be presented to the user based on one or more indicators that indicate a failure in resolving the user inquiry. As an example, an indicator can be that a number of user input words or sentences related to seeking the resolution satisfies an amount threshold. As another example, an indicator can be that a duration of the chat session satisfies a duration threshold. As another example, an indicator can be that a negative sentiment is detected in connection with the one or more user inputs.

Various other aspects, features, and advantages of the invention will be apparent through the detailed description of the invention and the drawings attached hereto. It is also to be understood that both the foregoing general description and the following detailed description are examples and not restrictive of the scope of the invention. As used in the specification and in the claims, the singular forms of "a," "an," and "the" include plural referents unless the context clearly dictates otherwise. In addition, as used in the specification and the claims, the term "or" means "and/or" unless the context clearly dictates otherwise.

BRIEF DESCRIPTION OF THE DRAWINGS

The accompanying drawings, which are incorporated in and constitute a part of this specification, illustrate several embodiments and, together with the description, serve to explain the disclosed principles. In the drawings.

DESCRIPTION OF THE EMBODIMENTS

In the following description, for the purposes of explanation, numerous specific details are set forth in order to provide a thorough understanding of the embodiments of the invention. It will be appreciated, however, by those having skill in the art that the embodiments of the invention may be practiced without these specific details or with an equivalent arrangement. In other cases, well-known structures and devices are shown in block diagram form in order to avoid unnecessarily obscuring the embodiments of the invention.

Figure 1:
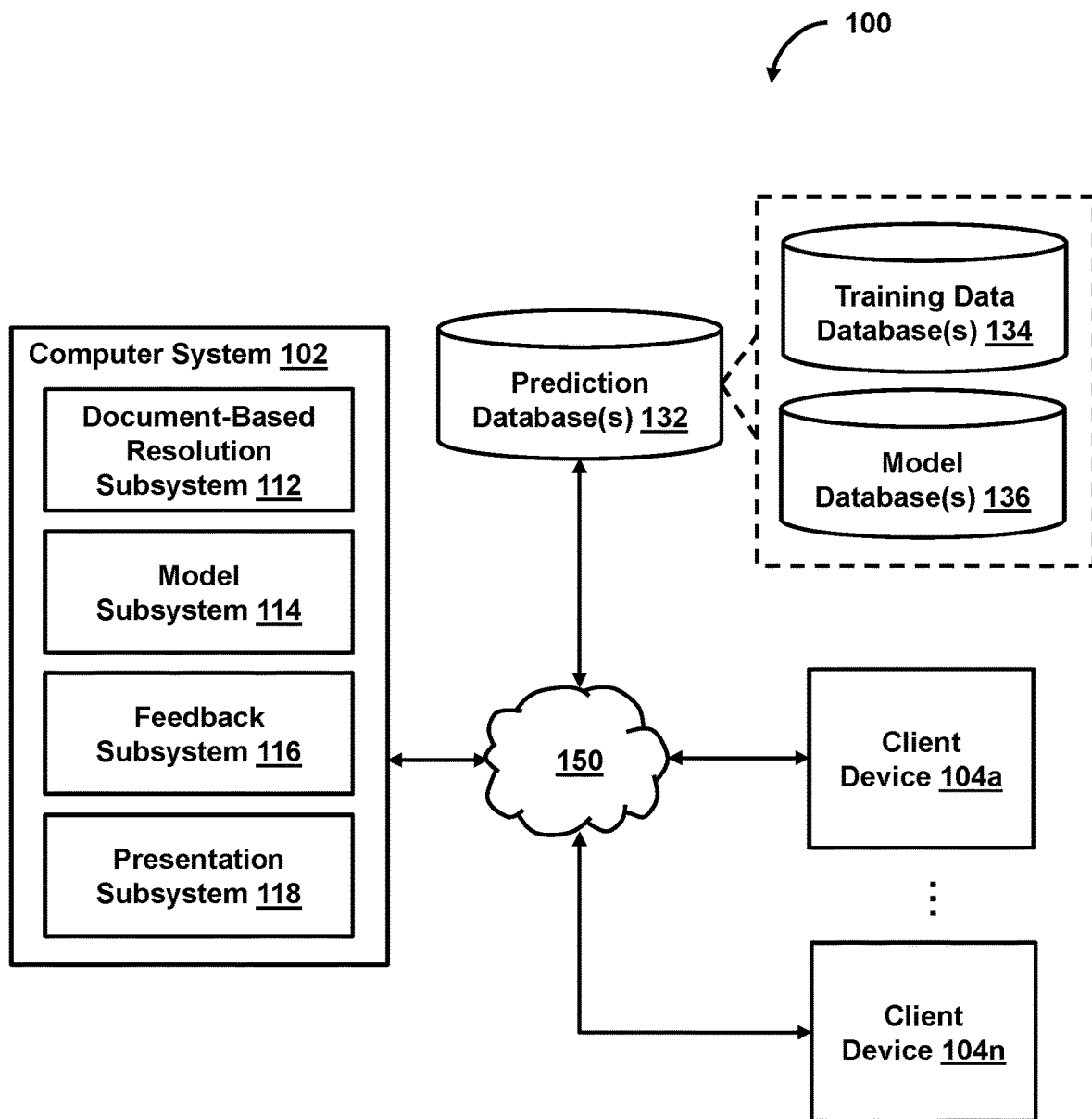
FIG. 1 shows a system for facilitating conversational artificial intelligence, in accordance with one or more embodiments.

FIG. 1 shows a system 100 for facilitating conversational artificial intelligence, in accordance with one or more embodiments. As shown in FIG. 1, system 100 may include computer system 102, client device 104 (or client devices 104a-104n), or other components. Computer system 102 may include document-based resolution subsystem 112, model subsystem 114, feedback subsystem 116, presentation subsystem 118, or other components. Each client device 104 may include any type of mobile terminal, fixed terminal, or other device. By way of example, client device 104 may include a desktop computer, a notebook computer, a tablet computer, a smartphone, a wearable device, or other client device. Users may, for instance, utilize one or more client devices 104 to interact with one another, one or more servers, or other components of system 100. It should be noted that, while one or more operations are described herein as being performed by particular components of computer system 102, those operations may, in some embodiments, be performed by other components of computer system 102 or other components of system 100. As an example, while one or more operations are described herein as being performed by components of computer system 102, those operations may, in some embodiments, be performed by components of client device 104. It should be noted that, although some embodiments are described herein with respect to machine learning models, other prediction models (e.g., statistical models or other analytics models) may be used in lieu of or in addition to machine learning models in other embodiments (e.g., a statistical model replacing a machine learning model and a non-statistical model replacing a non-machine-learning model in one or more embodiments).

In some embodiments, system 100 may facilitate a conversation with or assist a user via one or more prediction models. In some embodiments, system 100 may obtain a document via a prediction model based on a predicted intent of a user and cause the document to be presented on a user interface. In some embodiments, upon receiving a confirmation that the document is relevant to a user inquiry, system 100 may proceed with providing a resolution to the user inquiry. In some embodiments, upon receiving a confirmation that the document is not relevant to the user inquiry, system 100 may proceed with obtaining and presenting another document based on the predicted intent. In some embodiments, intent classification (e.g., automated association of text or actions to a specific goal or other intent) may be performed on chat information to determine the document items to be presented on the user interface. As an example, such intent classification may be performed via a neural network (e.g., where its last layer or other layer produces a probability distribution over classes) or one or more other prediction models.

In some embodiments, system 100 may obtain the document by providing a number of documents associated with the user as input to the prediction model and obtaining one or more documents based on metadata associated with the document matching the predicted intent. As an example, system 100 may obtain a document set from the prediction model, where each document of the document set is associated with a probability of matching a predicted intent of the user. System 100 may then select one or more documents from the document set based on the documents being associated with higher probabilities (e.g., higher confidence scores of matching a predicted intent of the user) than one or more other documents of the document set. The document may have user activity information and the metadata may be descriptive of the user activity information in a particular document. As an example, the documents may be provided as input to the prediction model based on one or more automated triggers (e.g., upon detecting an indication that an user inquiry is not resolved or other action of the user) to obtain one or more outputs from the neural network (e.g., via which one or more documents having metadata matching the predicted intent are obtained). The user activity information in the document may include service interaction information related to interactions of the user with one or more services (e.g., the latest interactions or other interactions of the user), transaction information related to transactions of the user (e.g., the latest transactions or other transactions of the user), email information related to interactions with or of the user with one or more services, or other user activity information (e.g., chat session information related to a current chat session or prior chat sessions with the user, information related to upcoming travel or other plans of the user, etc.).

In some embodiments, system 100 may obtain one or more predicted intents of a user via another prediction model (e.g., based on user inputs in a chat interface) and generate responses for presentation on the chat interface based on the predicted intents (e.g., for resolving a user inquiry). As an example, system 100 may obtain an intent set from the prediction model, where each intent of the intent set is associated with a probability of matching a current intent of the user. System 100 may then select the predicted intents from the intent set based on the predicted intents being associated with higher probabilities (e.g., higher confidence scores of matching a current intent of the user) than one or more other predicted intents of the intent set.

In some embodiments, system 100 may train or configure a prediction model to facilitate a conversation with or assist one or more users. In some embodiments, system 100 may obtain user input information associated with a user (e.g., chat activity information regarding a user inquiry in a chat interface) and provide such information as input to a prediction model to generate predictions (e.g., related to an intent of the user, such as a goal of the user, a question or statement that the user intends to submit, etc.). System 100 may provide reference feedback to the prediction model and the prediction model may update one or more portions of the prediction model based on the predictions and the reference feedback. As an example, where the prediction model generates predictions based on user input information coinciding with a given time period, one or more verified intents associated with such user activities may be provided as reference feedback to the prediction model. As an example, a particular goal may be verified as the user's intent (e.g., via user confirmation of the goal, via one or more subsequent actions demonstrating such goal, etc.) based on one or more user responses or one or more other user actions via one or more services. The foregoing user input information may be provided as input to the prediction model to cause the prediction model to generate predictions of the user's intent, and the verified goal may be provided as reference feedback to the prediction model to update the prediction model. In this way, for example, the prediction model may be trained or configured to generate more accurate predictions.

In some embodiments, system 100 may also train or configure a prediction model to facilitate obtaining a document associated with the user based on the predicted intent. In some embodiments, system 100 may obtain documents associated with a user (e.g., documents having user activity information) and provide them as input to a prediction model to generate predictions (e.g., whether each document is matching the predicted intent). System 100 may provide reference feedback to the prediction model, and the prediction model may update one or more portions of the prediction model based on the predictions and the reference feedback. As an example, where the prediction model generates predictions based on the document information (e.g., content of document), one or more verified concepts (e.g., topic, category, etc.) associated with such documents may be provided as reference feedback to the prediction model. As an example, a particular document may be verified as matching the predicted intent (e.g., via user confirmation of the document presented to the user, via one or more subsequent actions demonstrating such goal, etc.) when the user responds to the presentation of the document in the chat interface. The foregoing document information may be provided as input to the prediction model to cause the prediction model to generate predictions of whether a document matches the predicted intent, and the verified goal may be provided as reference feedback to the prediction model to update the prediction model. In this way, for example, the prediction model may be trained or configured to generate more accurate predictions.

In some embodiments, the foregoing operations for updating the prediction model may be performed with a training dataset with respect to one or more users (e.g., a training dataset associated with a given user to specifically train or configure the prediction model for the given user, a training dataset associated with a given cluster, demographic, or other group to specifically train or configure the prediction model for the given group, or other training dataset). As such, in some embodiments, subsequent to the updating of the prediction model, system 100 may use the prediction model to facilitate a conversation with or assist one or more users.

In some embodiments, the prediction model may include one or more neural networks or other machine learning models. As an example, neural networks may be based on a large collection of neural units (or artificial neurons). Neural networks may loosely mimic the manner in which a biological brain works (e.g., via large clusters of biological neurons connected by axons). Each neural unit of a neural network may be connected with many other neural units of the neural network. Such connections can be enforcing or inhibitory in their effect on the activation state of connected neural units. In some embodiments, each individual neural unit may have a summation function which combines the values of all its inputs together. In some embodiments, each connection (or the neural unit itself) may have a threshold function such that the signal must surpass the threshold before it propagates to other neural units. These neural network systems may be self-learning and trained, rather than explicitly programmed, and can perform significantly better in certain areas of problem solving, as compared to traditional computer programs. In some embodiments, neural networks may include multiple layers (e.g., where a signal path traverses from front layers to back layers). In some embodiments, back propagation techniques may be utilized by the neural networks, where forward stimulation is used to reset weights on the "front" neural units. In some embodiments, stimulation and inhibition for neural networks may be more free-flowing, with connections interacting in a more chaotic and complex fashion.

Figure 2:
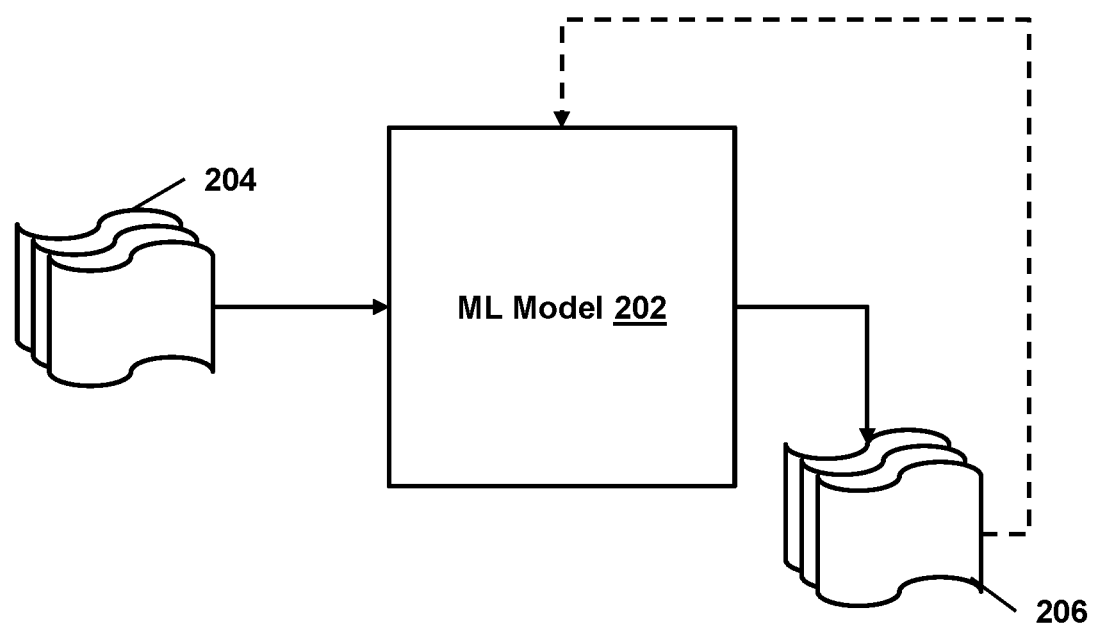
FIG. 2 shows a machine learning model configured to facilitate a conversation, in accordance with one or more embodiments.

As an example, with respect to FIG. 2, machine learning model 202 may take inputs 204 and provide outputs 206. In one use case, outputs 206 may be fed back to machine learning model 202 as input to train machine learning model 202 (e.g., alone or in conjunction with user indications of the accuracy of outputs 206, labels associated with the inputs, or with other reference feedback information). In another use case, machine learning model 202 may update its configurations (e.g., weights, biases, or other parameters) based on its assessment of its prediction (e.g., outputs 206) and reference feedback information (e.g., user indication of accuracy, reference labels, or other information). In another use case, where machine learning model 202 is a neural network, connection weights may be adjusted to reconcile differences between the neural network's prediction and the reference feedback. In a further use case, one or more neurons (or nodes) of the neural network may require that their respective errors are sent backward through the neural network to them to facilitate the update process (e.g., backpropagation of error). Updates to the connection weights may, for example, be reflective of the magnitude of error propagated backward after a forward pass has been completed. In this way, for example, the machine learning model 202 may be trained to generate better predictions.

Subsystems 112-118

Figure 3A:
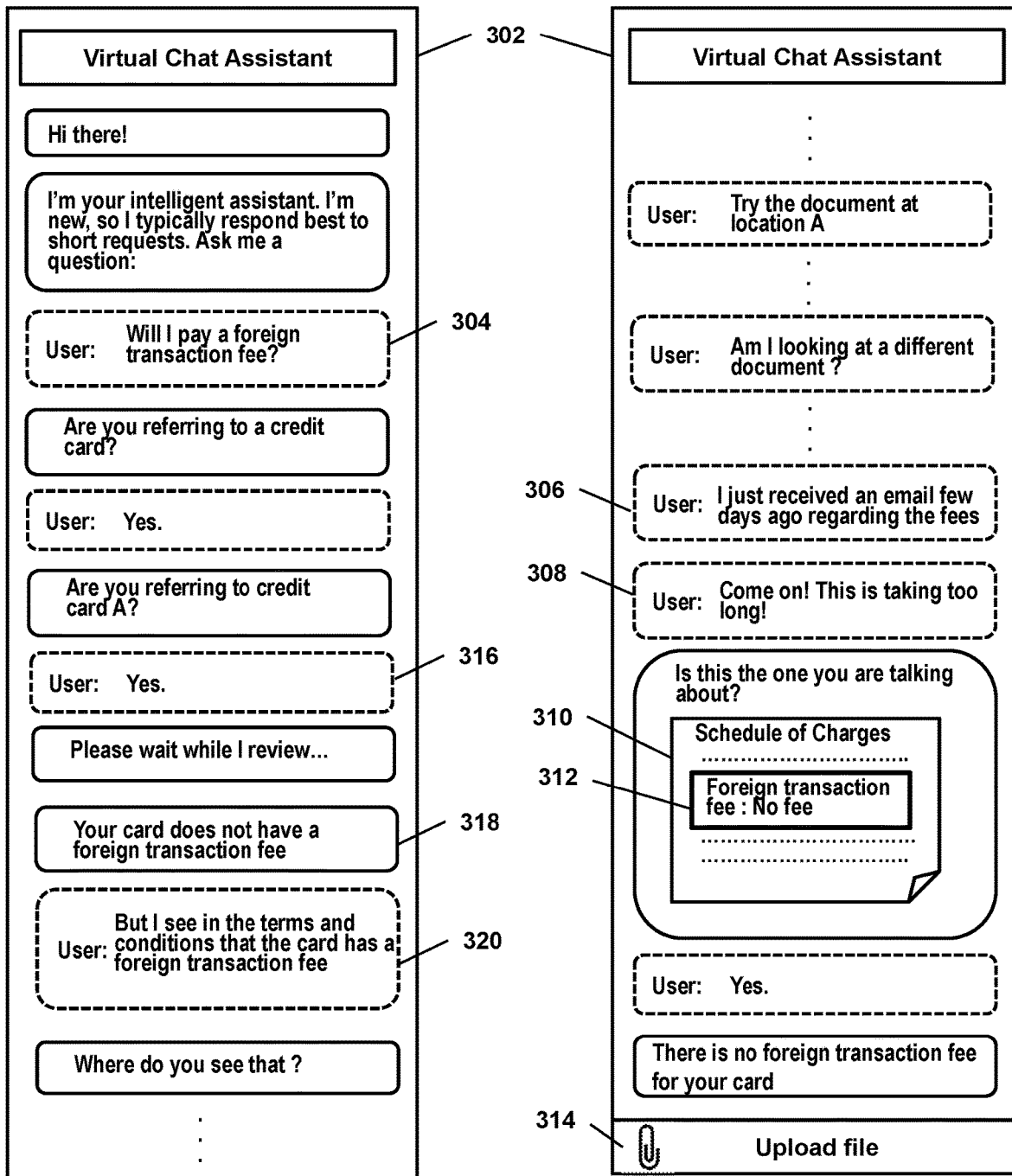
FIG. 3A shows a chat interface for facilitating user interactions via chat messages, in accordance with one or more embodiments.
Figure 3B:
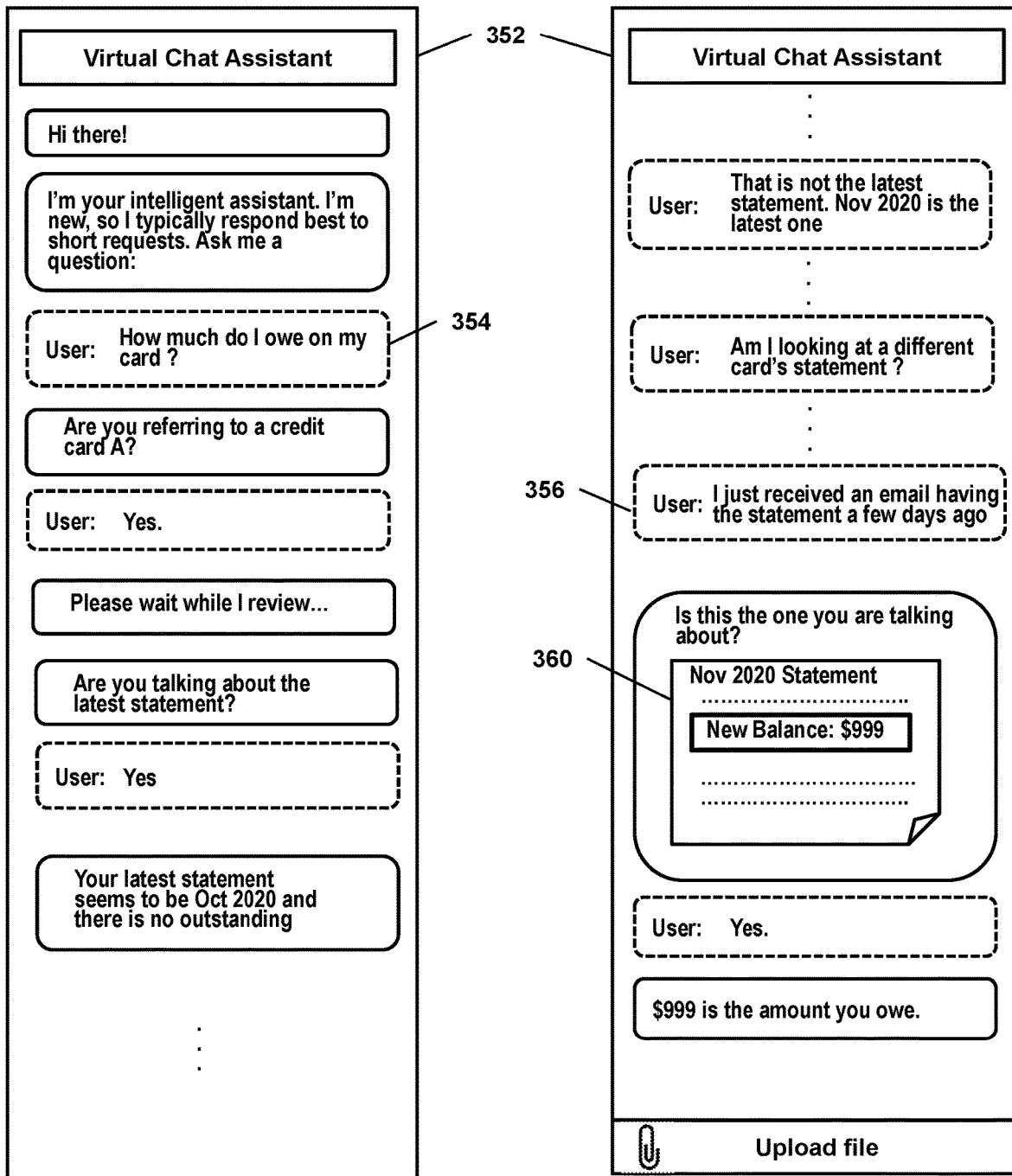
FIG. 3B shows another chat interface for facilitating user interactions via chat messages, in accordance with one or more embodiments.

In some embodiments, document-based resolution subsystem 112 may obtain a document via a prediction model, and presentation subsystem 118 may cause the document to be presented on a user interface for a user. In some embodiments, the document-based resolution subsystem 112 may obtain the document in response to detecting an indication of a failure in resolving a user inquiry. As an example, the document may be presented on the user interface in connection with seeking a confirmation from the user regarding the document's relevance to the user inquiry. In some embodiments, upon receiving a user confirmation that the document is relevant to the user inquiry, computer system 102 may proceed with providing a resolution to the user inquiry. As an example, the document may be presented in a chat interface 302 of FIG. 3A in connection with resolving a user inquiry. FIGS. 3A and 3B show a chat interface for facilitating user interactions via chat messages, in accordance with one or more embodiments. A user may access the chat interface 302 using a client device 104a. The chat interface 302 facilitates the user to interact with computer system 102 via chat messages for resolving an inquiry. The chat interface 302 may be associated with an application that provides services or products. As an example, the chat interface 302 may be associated with a financial services application that provides financial products or services.

The chat interface 302 facilitates the user to resolve a user inquiry via a conversation (e.g., chat messages). For example, the user may initiate a chat session by inputting an inquiry such as "Will I pay a transaction fee?" The user input is provided to model subsystem 114 for obtaining an output response that either resolves the inquiry or seeks further information from the user for resolving the inquiry. For example, model subsystem 114 may generate an output response requesting information, such as "Are you referring to a credit card?" and provide the output response to presentation subsystem 118 for presentation in the chat interface 302. The user may further input a response to the request, such as "yes," and the model subsystem 114 may generate a suitable response. As an example, model subsystem 114 may predict an intent of the user based on the user input information in the chat session and generate the output responses based on the predicted intent. Such interactions between the user and computer system 102 may continue until the user inquiry is resolved, or the chat session is otherwise terminated (e.g., terminated by the user or computer system 102).

In some embodiments, document-based resolution subsystem 112 may detect an indication of a failure in resolving the user inquiry (e.g., user indication or other automated triggers). As an example, document-based resolution subsystem 112 may detect an indication of a failure when a number of user input words or sentences related to seeking the resolution satisfies an amount threshold (e.g., greater than or equal to the amount threshold). As another example, an indicator can be that a duration of the chat session satisfies a duration threshold (e.g., greater than or equal to the duration threshold). As another example, an indicator can be that a negative sentiment is detected in connection with the user inputs. In the example of FIG. 3A, at the time when the chat interface 302 receives user input 306, document-based resolution subsystem 112 may determine that the user inquiry is still not resolved and the number of words or sentences between user input 304 and user input 306 has satisfied an amount threshold (e.g., 30 words, 10 sentences, or other amount) and accordingly may detect an indication of a failure in resolving the query. As another example, at the time when the chat interface 302 receives user input 306, document-based resolution subsystem 112 may determine that the user inquiry is still not resolved and the duration of the chat session has satisfied a duration threshold (e.g., 5 minutes, 8 minutes, or other duration) and accordingly may detect an indication of a failure in resolving the query. As another example, at the time when the chat interface 302 receives user input 308, document-based resolution subsystem 112 may determine that the user inquiry is still not resolved and determine a negative sentiment (e.g., frustration, anger, or other negative sentiment) of the user based on the user input 308, and accordingly may detect an indication of a failure in resolving the query.

In some embodiments, document-based resolution subsystem 112 may perform sentiment analysis monitoring to determine the sentiment associated with the user. As an example, the user input information may be provided as input to a sentiment analysis prediction model to obtain a polarity (e.g., a positive or negative sentiment) within word, phrase, sentence, or clause of the user input information. In some embodiments, feelings and emotions (e.g., angry, happy, sad, etc.) may also be obtained from the sentiment analysis prediction model. In some embodiments, the sentiment analysis prediction model may use various Natural Language Processing (NLP) methods or other methods to determine the sentiment. As an example, the sentiment analysis prediction model may use a set of user-defined rules (e.g., rules defined by an administrator associated with system 100 or other user) to identify the sentiment. These rules may define two lists of polarized words (e.g., negative words such as bad, worst, ugly, etc., and positive words such as good, best, beautiful, etc.). The sentiment analysis prediction model may count the number of positive and negative words that appear in an input text (e.g., user input 308) and determine a negative sentiment based on the number of negative word appearances in the input text being greater than the number of positive word appearances, and vice versa. As another example, the sentiment analysis prediction model may be trained to classify the input text into a category (e.g., a positive, negative, or neutral sentiment.) In the training process, feature vectors extracted from a particular input (e.g., user input or response) and a label associated with the corresponding input, such as a negative, positive, or neutral sentiment, are fed to the sentiment analysis prediction model as feature vector and label pairs. The sentiment analysis prediction model learns to associate each of the feature vectors to the corresponding label based on the training data (e.g., user input or response gathered from various chat sessions and that are associated with a label) used for training. In the prediction process, a feature vector of an unseen text (e.g., user input or response, such as user input 308 from chat session) is extracted and input to the sentiment analysis prediction model, which generates predicted labels (e.g., a positive, negative, or neutral sentiment).

In response to detecting an indication of failure in resolving the user inquiry, document-based resolution subsystem 112 may obtain a document 310, via a prediction model, and presentation subsystem 118 may present the document 310 in the chat interface 302. In some embodiments, document 310 may include information such as service interaction information related to interactions of the user with one or more services (e.g., the latest interactions or other interactions of the user), transaction information related to transactions of the user (e.g., the latest transactions or other transactions of the user), email information related to interactions with or of the user with one or more services, or other user activity information (e.g., chat session information related to a current chat session or prior chat sessions with the user, information related to upcoming travel or other plans of the user, etc.). As an example, the document 310 may be a utility bill associated with the user, a credit card, debit card, or other financial account statement, an email from one or more services, one or more images having various content information, etc. The document 310 may be presented in the chat interface 302 in connection with seeking a confirmation from the user regarding the relevance of the document 310 to the user inquiry. Responsive to obtaining a user response to the presentation of the document 310, model subsystem 114 may generate a response to the user response (e.g., for resolving the user inquiry), and presentation subsystem 118 may cause the response to be presented on the chat interface 302. In some embodiments, model subsystem 114 may generate the response (e.g., an answer to a selected question, etc.) based on the user response received from the user. For example, if the user response to the presentation of the document 310 is "Yes," model subsystem 114 may generate a response such as "There is no foreign transaction fee for your card" or other such response for resolving the user inquiry "Will I pay a foreign transaction fee?"

In the example of FIG. 3B, model subsystem 114 may, for each of the user's response or input information in the chat session, predict the same intent (e.g., amount owed by the user on their credit card statement) and generate the output responses based on the predicted intent. However, at the time when the chat interface 352 receives user input 356, document-based resolution subsystem 112 may determine that the user inquiry is still not resolved and the number of words or sentences between user input 354 and user input 356 has satisfied an amount threshold (e.g., 30 words, 10 sentences, or other amount) and accordingly may detect an indication of a failure in resolving the query. In response to detecting an indication of failure in resolving the user inquiry, document-based resolution subsystem 112 may obtain a document 360, via a prediction model, and presentation subsystem 118 may present the document 360 in the chat interface 352. As an example, the document 360 may be a credit card statement associated with the user. The document 360 may be presented in the chat interface 352 in connection with seeking a confirmation from the user regarding the relevance of the document 360 to the user inquiry. For example, if the user response to the presentation of the document 360 is "Yes," model subsystem 114 may generate a response such as "$999 is the amount you owe" or other such response based on the information in document 360 for resolving the user inquiry "How much do I owe on my card?"

In some embodiments, document-based resolution subsystem 112 obtains the document 310 via a prediction model based on metadata of the document 310 matching a predicted intent of the user. As an example, the metadata of the document 310 may include information regarding content of the document 310, such as a concept (e.g., a topic, a category, an interest, or other information) associated with the document 310 or one or more portions of the document 310, transaction information of transactions in the document 310 (e.g., electricity bill information, credit card spending information, transaction amount, transaction date, etc.) or other such information. In some embodiments, document-based resolution subsystem 112 may extract content of the document 310 (e.g., using optical character recognition or other methods) and generate metadata of the document 310 based on the extracted content. In some embodiments, obtaining the document 310 may include document-based resolution subsystem 112 providing a number of documents associated with the user as input to the prediction model to obtain concepts (e.g., a topic, a category, an interest, or other information) associated with each of the documents, and assigning a score to each of the documents that is indicative of a probability of a match between the document and the predicted intent of the user based on the concepts of the document. In some embodiments, document-based resolution subsystem 112 may obtain the document having the highest score as the document 310 for presentation to the user. In some embodiments, document-based resolution subsystem 112 may obtain a document set from the prediction model and select a subset of documents associated with higher probabilities (e.g., higher confidence scores of matching a predicted intent of the user) than one or more other documents of the document set for presentation to the user.

In some embodiments, document-based resolution subsystem 112 may present the subset of documents to the user based on user responses obtained in response to presentation of a document of the subset of documents. For example, presentation subsystem 118 may present a first document of the subset of documents (e.g., such as document 310) in response to detection of a failure in resolution of the user inquiry. The user may view the first document and provide a user response in response to the presentation of the first document. For example, if the user response to the presentation of the first document confirms a relevance of the first document to the user inquiry, model subsystem 114 may generate a response for resolving the user inquiry. However, if the user response to the presentation of the first document confirms that the first document is not relevant to the user inquiry, document-based resolution subsystem 112 may obtain a second document from the subset of the documents for presentation to the user.

In some embodiments, document-based resolution subsystem 112 may identify a document portion 312 of the document 310 that is relevant to the predicted intent more than other document portions of the document 310. For example, document-based resolution subsystem 112 may obtain, via the prediction model, concepts associated with various document portions of the document 310, and assign each document portion a score that is indicative of a probability of the document portion matching the predicted intent of the user. Document-based resolution subsystem 112 may then select one or more document portions from the document based on the document portions being associated with higher probabilities (e.g., higher confidence scores of matching the predicted intent of the user) than one or more other document portions of the document for presentation to the user.

The presentation subsystem 118 may present the document 310 or the document portion 312 in the chat interface 302 in a number of ways. For example, presentation subsystem 118 may present a link corresponding to document 310 in the chat interface 302, which, when selected by the user, presents document 310 to the user in the client device 104a. In another example, presentation subsystem 118 may present an image representative of document 310 (e.g., a thumbnail) in the chat interface 302 which, when selected by the user, presents document 310 to the user. In another example, presentation subsystem 118 may present document 310 (e.g., a thumbnail) in the chat interface 302 for downloading by the user to the client device 104a. In another example, presentation subsystem 118 may present an image depicting one or more document portions of document 310, where document portion 312 is emphasized to indicate that document portion 312 is relevant to the predicted intent more than the other document portions of document 310. In another example, presentation subsystem 118 may present an image having document portion 312 which, when selected by the user, presents document 310 to the user with document portion 312 emphasized in document 310. Presentation subsystem 118 may emphasize document portion 312 in a number of ways. For example, presentation subsystem 118 may emphasize document portion 312 by highlighting text in document portion 312 in a specified color, making the text in document portion 312 of a different font, size, style from that of the text in the other document portions, or provide other such emphasis. In another example, presentation subsystem 118 may emphasize document portion 312 by enclosing document portion 312 in an outline (such as a rectangular outline as shown in FIG. 3A).

In some embodiments, document-based resolution subsystem 112 may facilitate the user to upload a file (e.g., a document, an image, or other file) that may be used by model subsystem 114 to further predict the intent of the user in resolving the user inquiry. For example, model subsystem 114 may provide the uploaded document to a prediction model to predict an intent of the user based on content of the uploaded file. In some embodiments, document-based resolution subsystem 112 may have presentation subsystem 118 present an upload option 314 in chat interface 302 for facilitating the user to upload a file to computer system 102. The document-based resolution subsystem 112 may control the presentation of the upload option 314 in the chat interface 302 in various ways. For example, presentation subsystem 118 may present the upload option 314 in chat interface 302 when the chat session starts, and the user may upload the file anytime during the chat session. In another example, presentation subsystem 118 may present the upload option 314 in response to document-based resolution subsystem 112 detecting a failure in resolution of the user inquiry. In another example, presentation subsystem 118 may present the upload option 314 in response to document-based resolution subsystem 112 detecting a failure in resolution of the user inquiry even after presentation of one or more documents, such as after presentation of document 310, to the user.

In some embodiments, model subsystem 114 may provide chat activity information associated with the user (e.g., chat messages exchanged between the user and computer system 102) as input to a prediction model to obtain one or more predicted intents of the user, and presentation subsystem 118 may cause one or more responses to be presented on a user interface (e.g., chat interface 302) based on the predicted intents of the user. As an example, with reference to chat interface 302, model subsystem 114 may provide one or more messages exchanged with the user (e.g., messages input by the user or messages presented to the user), such as messages 304-316, to the prediction model to obtain the predicted intent. In some embodiments, model subsystem 114 may obtain an intent set from the prediction model and select one or more predicted intents from the intent set, where each predicted intent of the intent set is associated with a probability of matching a current intent of the user. In some embodiments, one or more predicted intents may be selected from the intent set based on a determination that the probabilities of the predicted intents are greater than or equal to the probabilities of other predicted intents of the intent set.

Additionally, or alternatively, the predicted intents may be selected from the intent set based on a determination that the probabilities of the predicted intents satisfy one or more probability thresholds (e.g., greater than or equal to a minimum confidence score threshold).

In some embodiments, model subsystem 114 may train or configure a first prediction model to facilitate a conversation with or assist one or more users. In some embodiments, model subsystem 114 may obtain chat activity information associated with a number of users and provide such information as input to the first prediction model to generate predictions (e.g., related to an intent of the user, such as a goal of the user, a question or statement that the user intends to submit, etc.). Additionally, or alternatively, account information or other information associated with the user may be provided as input to the first prediction model to generate such predictions. Feedback subsystem 116 may provide reference feedback to the first prediction model, and the first prediction model may update one or more portions of the prediction model based on the predictions and the reference feedback. In one use case, where the first prediction model includes a neural network, the neural network may assess its predictions (e.g., its predicted intents, their associated confidence scores, or other probabilities, etc.) against the reference feedback (e.g., verified intents). The neural network may then update its weights, biases, or other parameters based on the prediction assessment. In some embodiments, the foregoing operations for updating the first prediction model may be performed with a training dataset with respect to one or more users (e.g., a training dataset associated with a given user to specifically train or configure the first prediction model for the given user, a training dataset associated with a given cluster, demographic, or other group to specifically train or configure the first prediction model for the given group, or other training dataset).

As an example, where the first prediction model generates predictions based on user chat activity information coinciding with a given time period, one or more verified intents associated with such user chat activity information may be provided as reference feedback to the prediction model. In one use case, a particular goal may be verified as the user's intent (e.g., via user confirmation of the goal, via one or more subsequent actions demonstrating such goal, etc.) based on one or more user responses or one or more other user actions via one or more services. The foregoing user chat activity information may be provided as input to the first prediction model to cause the first prediction model to generate predictions of the user's intent, and the verified goal may be provided as reference feedback to the first prediction model to update the prediction model. In this way, for example, the first prediction model may be trained or configured to generate more accurate predictions.

In some embodiments, document-based resolution subsystem 112 may train or configure a second prediction model to facilitate obtaining a document associated with the user based on the predicted intent (e.g., obtained from the first prediction model). In some embodiments, document-based resolution subsystem 112 may obtain documents associated with a user (e.g., documents having user activity information) and provide them as input to a second prediction model to generate predictions (e.g., whether each document is matching the predicted intent). Additionally, or alternatively, account information or other information associated with the user (e.g., which may provide access to various user information) may be provided as input to the second prediction model to generate such predictions. Feedback subsystem 116 may provide reference feedback to the second prediction model, and the second prediction model may update one or more portions of the second prediction model based on the predictions and the reference feedback. In one use case, where the second prediction model includes a neural network, the neural network may assess its predictions (e.g., its predicted intents, their associated confidence scores, or other probabilities, etc.) against the reference feedback (e.g., verified intents). The neural network may then update its weights, biases, or other parameters based on the prediction assessment. In some embodiments, the foregoing operations for updating the second prediction model may be performed with a training dataset with respect to one or more users (e.g., a training dataset associated with a given user to specifically train or configure the second prediction model for the given user, a training dataset associated with a given cluster, demographic, or other group to specifically train or configure the second prediction model for the given group, or other training dataset).

As an example, where the second prediction model generates predictions based on document information (e.g., content of the document), one or more verified concepts (e.g., topic, category, etc.) associated with such documents may be provided as reference feedback to the second prediction model. As an example, a particular document may be verified as matching the predicted intent (e.g., via user confirmation of the document presented to the user, via one or more subsequent actions demonstrating such goal, etc.) when the user responds to the presentation of the document in the chat interface. The foregoing document information may be provided as input to the second prediction model to cause the second prediction model to generate predictions of documents matching the predicted intent, and the verified goal may be provided as reference feedback to the second prediction model to update the second prediction model. In this way, for example, the second prediction model may be trained or configured to generate more accurate predictions.

In some embodiments, presentation subsystem 118 may cause one or more documents (e.g., document 310) to be presented on a user interface based on one or more predicted intents of a user (e.g., provided via a prediction model), and document-based resolution subsystem 112 may obtain a user response to presentation of a document (or the documents) via the user interface. Based on the user response and the first document corresponding to a first intent (of the predicted intents) (e.g., the first document matches the first intent), feedback subsystem 116 may use the first intent to update one or more configurations of the prediction model (e.g., one or more weights, biases, or other parameters of the prediction model). In one use case, feedback subsystem 116 may provide the first intent as reference feedback to the prediction model, and, in response, the prediction model may assess its predicted intents (and/or their associated probabilities) against the first intent (and/or its associated probabilities). Based on its assessment, the prediction model may update one or more weights, biases, or other parameters of the prediction model. In this way, for example, the user selection of the presented documents may be used to further train or configure the prediction model (e.g., specifically for the user, specifically for a group associated with the user, etc.).

In some embodiments, where the user response indicates that a presented document does not match the user's current intent or provides a different response (e.g., uploads a file or document different from the presented documents), the foregoing response (or lack thereof) may be used to update one or more portions of the prediction model, an intent set from which one or more intents is to be predicted, or a document set from which one or more documents may be selected. As an example, when the user response indicates that none of the presented documents match the current intent of the user and provides another file or document (e.g., uploaded by the user via chat interface 302), document-based resolution subsystem 112 may provide the uploaded document to a prediction model to obtain the concepts associated with uploaded document or perform natural language processing to determine one or more intents associated with the user. In some embodiments, the intent set or the document set may be subsets of larger collection of potential intents and documents, and the intent set or the document sets may be updated based on the user's responses so that the correct document(s) or document portion(s) may be presented when the user returns in the same or substantially similar circumstance.

In some embodiments, where the user selects a presented document corresponding to a predicted intent (e.g., obtained from a prediction model), feedback subsystem 116 may determine a feedback score associated with the predicted intent (e.g., based on the user selecting the corresponding document) or the predicted document and use the feedback score to update one or more configurations of the prediction model (e.g., one or more weights, biases, or other parameters of the prediction model). In some embodiments, feedback subsystem 116 may provide the feedback score as reference feedback to the prediction model, and, in response, the prediction model may assess its predicted intents (and/or their associated probabilities) or predicted documents based on the feedback score. Based on its assessment, the prediction model may update one or more weights, biases, or other parameters of the prediction model.

In some embodiments, feedback subsystem 116 may determine the feedback score for the predicted intent or the predicted document based on a probability associated with the predicted intent the predicted document, a category associated with the predicted intent or the predicted document, or other criteria. As an example, the feedback score may be a confidence score associated with the predicted intent or the predicted document, or the feedback score may be calculated based on the confidence score. As another example, where the predicted intent or the predicted document is associated with a probability (e.g., a confidence score or other probability) in a given tier, feedback subsystem 116 may determine the feedback score based on the tier in which the probability of the predicted intent or the predicted document resides.

Example Flowchart(s)

The example flowchart(s) described herein of processing operations of methods that enable the various features and functionality of the system as described in detail above. The processing operations of each method presented below are intended to be illustrative and non-limiting. In some embodiments, for example, the methods may be accomplished with one or more additional operations not described, and/or without one or more of the operations discussed. Additionally, the order in which the processing operations of the methods are illustrated (and described below) is not intended to be limiting.

In some embodiments, the methods may be implemented in one or more processing devices (e.g., a digital processor, an analog processor, a digital circuit designed to process information, an analog circuit designed to process information, a state machine, and/or other mechanisms for electronically processing information). The processing devices may include one or more devices executing some or all of the operations of the methods in response to instructions stored electronically on an electronic storage medium. The processing devices may include one or more devices configured through hardware, firmware, and/or software to be specifically designed for execution of one or more of the operations of the methods.

Figure 4:
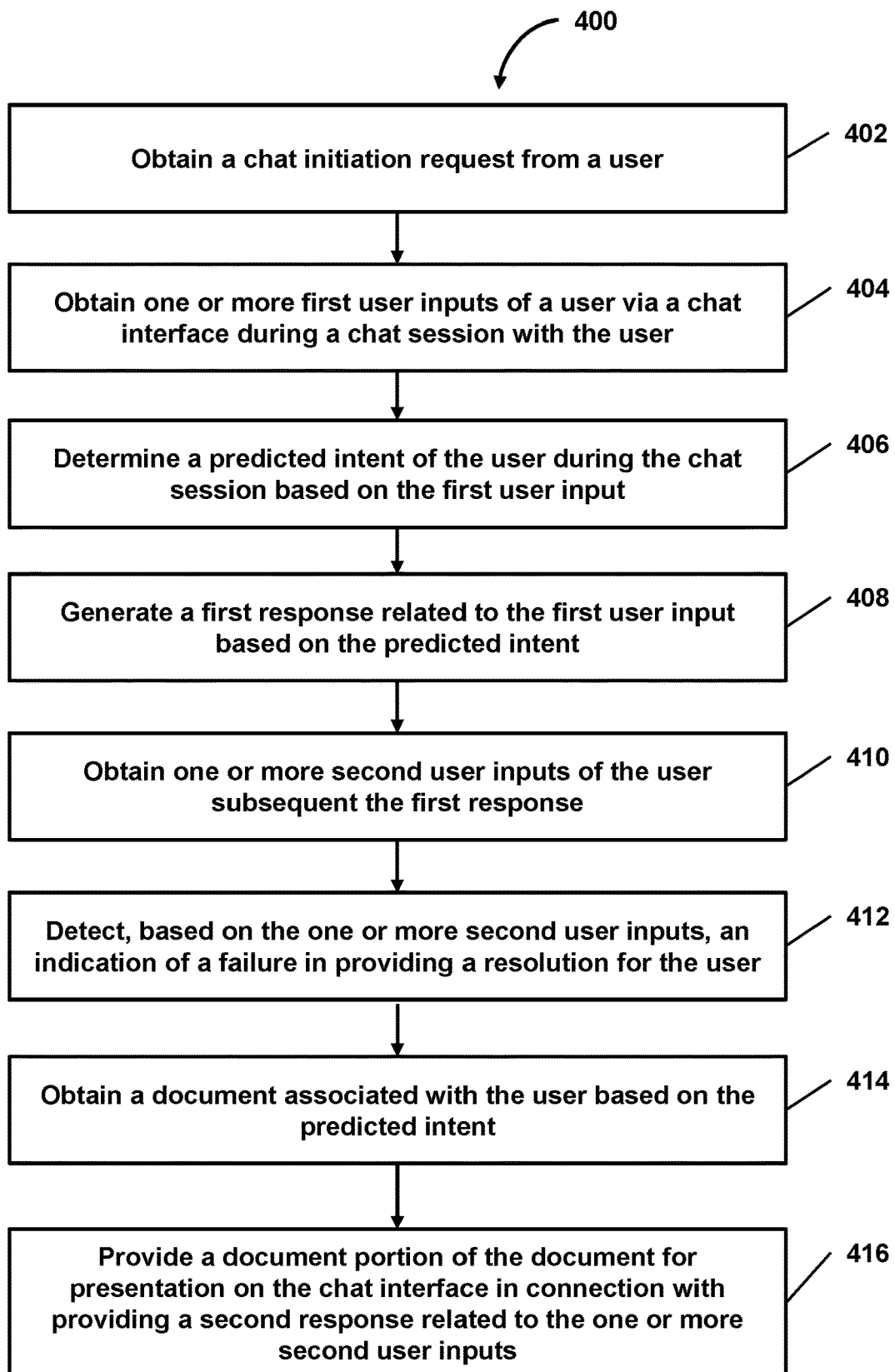
FIG. 4 shows a flowchart of a method of facilitating document-based resolution of user inquiry in a chat interface, in accordance with one or more embodiments.

FIG. 4 shows a flowchart of a method 400 of facilitating document-based resolution of user inquiry in a chat interface, in accordance with one or more embodiments. In an operation 402, a chat initiation request may be obtained from a customer. As an example, upon obtaining the chat initiation request, a chat session may be initiated, and a chat interface may be provided for presentation to the customer (e.g., on a client device 104a). Operation 402 may be performed by a subsystem that is the same as or similar to presentation subsystem 118, in accordance with one or more embodiments.

In an operation 404, user input information associated with a customer inquiry may be obtained from the customer. As an example, the user input information may be associated with a customer inquiry and may include one or more chat messages exchanged with the customer in chat interface 302 (e.g., messages 304-316). Operation 402 may be performed by a subsystem that is the same as or similar to presentation subsystem 118, in accordance with one or more embodiments.

In an operation 406, user input information may be provided as input to a neural network to obtain a predicted intent of the customer. As an example, the user input information, such as messages 304-316, may be provided as input to the neural network after a predetermined number of messages are obtained from the customer. As another example, the user input information may be provided as input to the neural network on a periodic basis, in accordance with a schedule, or based on one or more other automated triggers to obtain one or more outputs from the neural network (e.g., via which predicted intents are obtained). Operation 406 may be performed by a subsystem that is the same as or similar to model subsystem 114, in accordance with one or more embodiments.

In an operation 408, a first response may be obtained based on the predicted intent and presented on the chat interface. As an example, a first response, such as message 318, for resolving the customer inquiry or seeking further information regarding the customer inquiry may be presented on the chat interface. Operation 408 may be performed by a subsystem that is the same as or similar to model subsystem 114 and presentation subsystem 118, in accordance with one or more embodiments.

In an operation 410, a second user input may be obtained from the customer via the chat interface subsequent to the first response, where the second input may include one or more messages regarding the customer inquiry or the first response. As an example, messages 320-306 may be received from the customer responsive to the first response from computer system 102 (e.g., message 318). Operation 410 may be performed by a subsystem that is the same as or similar to model subsystem 114 or presentation subsystem 118, in accordance with one or more embodiments.

In an operation 412, based on the second user input, an indication of failure in providing resolution to the customer inquiry may be detected. As an example, an indication of the failure may be detected when a number of user input words or sentences (e.g., messages 304-306) related to seeking the resolution satisfies an amount threshold. As another example, an indication of the failure may be detected when a duration of the chat session satisfies a duration threshold. As another example, an indication of the failure may be detected when a negative sentiment is detected in connection with the second user input (e.g., message 308). Operation 412 may be performed by a subsystem that is the same as or similar to document-based resolution subsystem 112, in accordance with one or more embodiments.

In an operation 414, one or more documents associated with the customer may be provided as input to a neural network to obtain a document matching the predicted intent of the customer. As an example, document 310 may be obtained via the neural network. In some embodiments, a document portion of the document that is relevant to the predicted intent more than other document portions of the document may also be determined by the neural network. Additional details with reference to obtaining the document or the document portion matching the predicted intent is described at least with reference to FIG. 5 below. In some embodiments, document 310 may include information such as service interaction information related to interactions of the user with one or more services (e.g., the latest interactions or other interactions of the user), transaction information related to transactions of the user (e.g., the latest transactions or other transactions of the user), email information related to interactions with or of the user with one or more services, or other user activity information (e.g., chat session information related to a current chat session or prior chat sessions with the user, information related to upcoming travel or other plans of the user, etc.). As an example, the document 310 may be a utility bill associated with the user, a credit card related document, a debit card related document, or other financial account statement, an email from one or more services, one or more images having various content information, etc. Operation 414 may be performed by a subsystem that is the same as or similar to document-based resolution subsystem 112, in accordance with one or more embodiments.

In an operation 416, the document is presented in the chat interface as a response to the second user input. As an example, the document 310 is presented in the chat interface 302 in response to the messages 320-306. In some embodiments, the document 310 may be presented in the chat interface 302 in connection with seeking a confirmation from the customer regarding the relevance of the document 310 to the customer inquiry. As an example, responsive to obtaining a user response confirming the relevance of the document 310 to the customer inquiry, a response to the user response (e.g., for resolving the user inquiry) may be presented in the chat interface. As another example, responsive to obtaining a user response confirming the document 310 is not relevant to the customer inquiry, another document (e.g., from a document set matching the predicted intent) matching the predicted intent may be presented in the chat interface. In some embodiments, a document portion of the document that is relevant to the predicted intent more than other document portions of the document may be presented in the chat interface. The document or document portion may be presented in the chat interface in a number of ways. For example, a link corresponding to document may be presented in the chat interface. In another example, an image representative of the document (e.g., a thumbnail) may be presented which, when selected by the user, the entire document or the document portion is presented to the user. In another example, an image having one or more document portions may be presented, where the document portion that is relevant to the predicted intent more than the other document portions of the document is emphasized. Operation 416 may be performed by a subsystem that is the same as or similar to document-based resolution subsystem 112 or presentation subsystem 118, in accordance with one or more embodiments.

Figure 5:
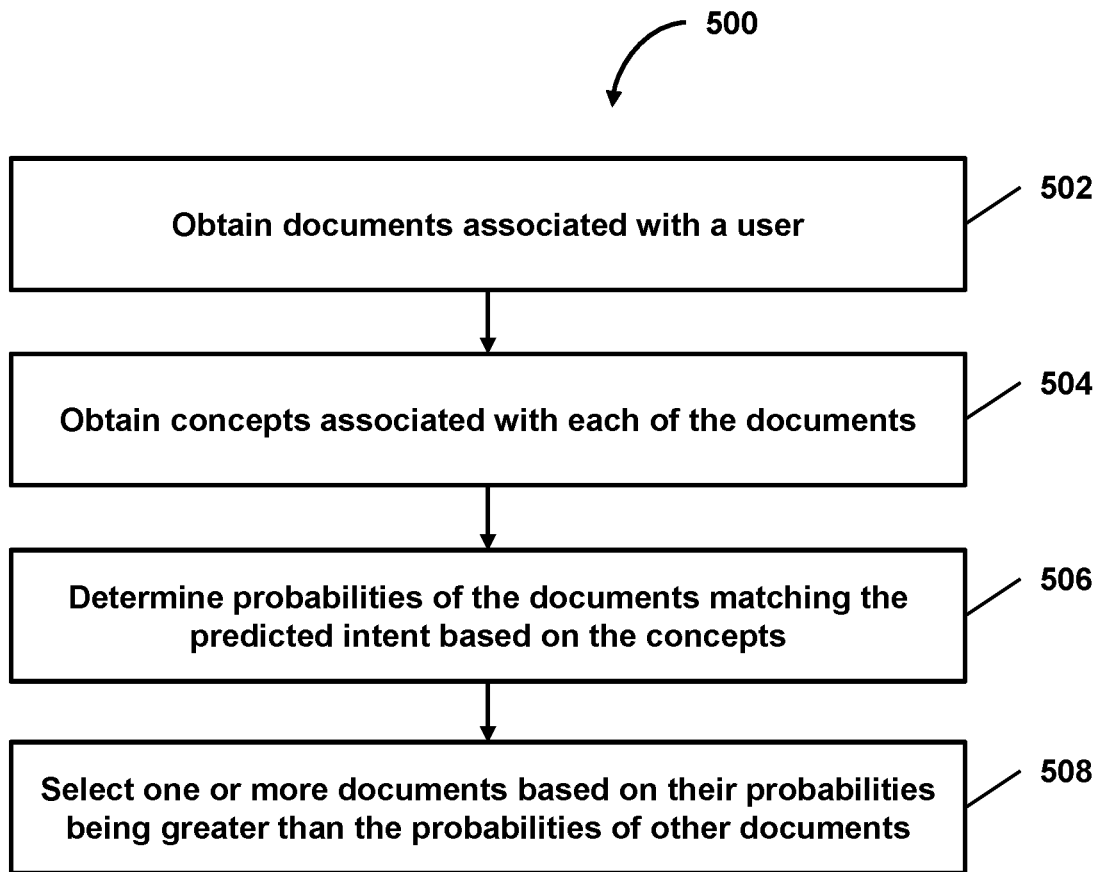
FIG. 5 shows a flowchart of a method of obtaining one or documents matching the predicted intent, in accordance with one or more embodiments.

FIG. 5 shows a flowchart of a method 500 of obtaining one or documents matching the predicted intent, in accordance with one or more embodiments. In some embodiments, the method 500 may be implemented as part of operation 414 of method 400 of FIG. 4. In an operation 502, documents associated with a customer may be obtained. As an example, the documents associated with the customer may be obtained from a user account associated with one or more services with which the customer has registered, from the customer, or another source.

In an operation 504, the documents are provided as input to a neural network to obtain concepts associated with each of the documents. As an example, a concept may include a topic, category, an interest, or other such information associated with a document. In some embodiments, the concepts are obtained by analyzing the content (e.g., text) of each of the documents. The metadata of the documents may be updated accordingly. As an example, the metadata of the document may include information regarding content of the document, such as a concept associated with the document or one or more document portions of the document, transaction information of transactions in the document (e.g., electricity bill information, credit card spending information, transaction amount, transaction date, etc.) or other such information. Operation 504 may be performed by a subsystem that is the same as or similar to document-based resolution subsystem 112, in accordance with one or more embodiments.

In an operation 506, a probability of each document matching the predicted intent may be determined based on the concepts associated with the document. As an example, a confidence score may be assigned to each of the documents that is indicative of a probability of the match, where the higher the confidence score the higher is the probability of the match. In some embodiments, a probability of one or more document portions of the document matching the predicted intent may also be determined based on the concepts associated with the document portions. Operation 506 may be performed by a subsystem that is the same as or similar to document-based resolution subsystem 112, in accordance with one or more embodiments.

In an operation 508, one or more documents may be selected based on their probabilities satisfying a probability threshold (e.g., greater than or equal to a minimum probability threshold). As an example, one or more documents may be selected based on their confidence scores satisfying a threshold (e.g., greater than or equal to a minimum confidence score threshold). In some embodiments, one or more document portions of the document may also be selected based on their probabilities satisfying a probability threshold (e.g., greater than or equal to a minimum probability threshold). In some embodiments, a new document may be generated from the selected documents or other available user information and the new document may be presented in the chat interface. As an example, the documents associated with the user include monthly credit card statements, and the user inquiry may be about charges associated with a specified merchant for a specified quarter. Such "not-readily available" user requested information may be obtained by providing one or available documents or other transaction information of the user (e.g., credit card charge information stored in a database) as input to document-based resolution subsystem 112, which processes the content of the available documents (e.g., extract content and process the extracted content) or other transaction information to obtain the request information and generate a document with the requested information. Operation 508 may be performed by a subsystem that is the same as or similar to document-based resolution subsystem 112, in accordance with one or more embodiments.

In some embodiments, the various computers and subsystems illustrated in FIG. 1 may include one or more computing devices that are programmed to perform the functions described herein. The computing devices may include one or more electronic storages (e.g., prediction database(s) 132, which may include training data database(s) 134, model database(s) 136, etc., or other electronic storages), one or more physical processors programmed with one or more computer program instructions, and/or other components. The computing devices may include communication lines or ports to enable the exchange of information within a network (e.g., network 150) or other computing platforms via wired or wireless techniques (e.g., Ethernet, fiber optics, coaxial cable, WiFi, Bluetooth, near field communication, or other technologies). The computing devices may include a plurality of hardware, software, and/or firmware components operating together. For example, the computing devices may be implemented by a cloud of computing platforms operating together as the computing devices.

The electronic storages may include non-transitory storage media that electronically stores information. The storage media of the electronic storages may include one or both of (i) system storage that is provided integrally (e.g., substantially non-removable) with servers or client devices or (ii) removable storage that is removably connectable to the servers or client devices via, for example, a port (e.g., a USB port, a firewire port, etc.) or a drive (e.g., a disk drive, etc.). The electronic storages may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include one or more virtual storage resources (e.g., cloud storage, a virtual private network, and/or other virtual storage resources). The electronic storage may store software algorithms, information determined by the processors, information obtained from servers, information obtained from client devices, or other information that enables the functionality as described herein.

The processors may be programmed to provide information processing capabilities in the computing devices. As such, the processors may include one or more of a digital processor, an analog processor, a digital circuit designed to process information, an analog circuit designed to process information, a state machine, and/or other mechanisms for electronically processing information. In some embodiments, the processors may include a plurality of processing units. These processing units may be physically located within the same device, or the processors may represent processing functionality of a plurality of devices operating in coordination. The processors may be programmed to execute computer program instructions to perform functions described herein of subsystems 112-118 or other subsystems. The processors may be programmed to execute computer program instructions by software; hardware; firmware; some combination of software, hardware, or firmware; and/or other mechanisms for configuring processing capabilities on the processors.

It should be appreciated that the description of the functionality provided by the different subsystems 112-118 described herein is for illustrative purposes, and is not intended to be limiting, as any of subsystems 112-118 may provide more or less functionality than is described. For example, one or more of subsystems 112-118 may be eliminated, and some or all of its functionality may be provided by other ones of subsystems 112-118. As another example, additional subsystems may be programmed to perform some or all of the functionality attributed herein to one of subsystems 112-118.

Although the present invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the scope of the appended claims. For example, it is to be understood that the present invention contemplates that, to the extent possible, one or more features of any embodiment can be combined with one or more features of any other embodiment.

The present techniques will be better understood with reference to the following enumerated embodiments:

1. A method comprising: detecting, based on chat activity information of a user in a chat interface, an indication of a failure in providing a resolution for the user; obtaining a document associated with the user based on a predicted intent of the user, wherein the predicted intent is determined based on one or more user inputs in the chat activity information; and in response to the detected failure indication, providing one or more document portions of the document for presentation on the chat interface in connection with providing the resolution.

2. The method of embodiment 1, wherein detecting the failure includes: obtaining a first user input of a user via the chat interface during a chat session with the user; determining the predicted intent based on the first user input.

3. The method of embodiment 2, further comprising: generating, via the chat interface, a first response related to the first user input based on the predicted intent.

4. The method of any of embodiments 1-3, wherein detecting the failure includes: obtaining one or more second user inputs of the user subsequent the first response; and detecting, based on the one or more second user inputs, an indication of a failure in providing a resolution for the user.

5. The method of any of embodiments 1-4, wherein detecting the failure includes: detecting that a number of user input words or sentences related to seeking the resolution satisfies an amount threshold.

6. The method of any of embodiments 1-5, wherein detecting the failure includes: detecting that a duration of the chat session satisfies a duration threshold.

7. The method of any of embodiments 1-6, wherein detecting the failure includes: detecting a negative sentiment in connection with the one or more user inputs in the chat activity information.

8. The method of any of embodiments 1-7, further comprising: in response to detecting the indication of the failure, presenting a graphical user interface element in the chat interface for facilitating the user to upload a specified document.

9. The method of any of embodiments 1-8, wherein providing the one or more document portions includes: selecting the one or more document portions over one or more other document portions based on the one or more document portions being a greater match with the predicted intent than the one or more other document portions.

10. The method of any of embodiments 1-9, wherein providing the one or more document portions includes: presenting, based on the selection, an image depicting the one or more document portions.

11. The method of any of embodiments 9-10, wherein providing the one or more document portions includes: presenting the document via the chat interface, wherein the selected one or more document portions is emphasized relative to other one or more document portions.

12. The method of any of embodiments 1-11, wherein obtaining the document includes: obtaining metadata of each of a plurality of documents associated with the user based on content extracted from each of the documents, and obtaining the document from the documents based on metadata of the document matching the predicted intent.

13. The method of any of embodiments 1-12, further comprising: providing the document to a prediction model to obtain concepts associated with document portions of the document; determining a probability of a document portion matching the predicted intent based on the concepts associated with the document portion; and selecting one or more document portions of the document over one or more other document portions of the document based on probabilities associated with the one or more document portions being greater than the probabilities associated with the one or more other document portions.

14. The method of any of embodiments 1-13, wherein obtaining the document includes: providing a plurality of documents associated with a user to a prediction model to obtain concepts associated with each of the documents; determining a probability of each of the documents matching the predicted intent based on the concepts associated with the document; and selecting one or more documents over one or more other documents based on probabilities associated with the one or more documents being greater than the probabilities associated with the one or more other documents.

15. The method of any of embodiments 1-14, wherein obtaining the document includes: obtaining a document set using a prediction model, wherein each document of the document set is associated with a probability of matching a current intent of the user; and selecting one or more documents from the document set based on the one or more documents being associated with higher probabilities than one or more other documents of the intent set.

16. The method of any of embodiments 1-15, wherein obtaining the document includes: providing one or more of a plurality of documents associated with the user to a prediction model to generate a document based on the one or more of the plurality of documents.

17. The method of any of embodiments 1-16, further comprising: obtaining an intent set using a prediction model, wherein each intent of the intent set is associated with a probability of matching a current intent of the user; and selecting one or more predicted intents from the intent set based on the one or more predicted intents being associated with higher probabilities than one or more other predicted intents of the intent set.

18. The method of any of embodiments 13-17, wherein the prediction model comprises a neural network or other machine learning model.

19. A tangible, non-transitory, machine-readable medium storing instructions that, when executed by a data processing apparatus, causes the data processing apparatus to perform operations comprising those of any of embodiments 1-18.

20. A system comprising: one or more processors; and memory storing instructions that, when executed by the processors, cause the processors to effectuate operations comprising those of any of embodiments 1-18.

What is claimed is:

1. A system for facilitating a virtual-assistant-based resolution of user inquiries via negative-feedback-triggered document presentation, the system comprising:
   a computer system that comprises one or more processors programmed with computer program instructions that, when executed, cause operations comprising:
   obtaining a first user input of a user via a chat interface;
   determining a predicted intent of the user based on the first user input;
   generating, via the chat interface, a first response related to the first user input based on the predicted intent;
   obtaining, via a prediction model, concepts associated with a document, the concepts comprising one or more first concepts associated with one or more document portions and one or more second concepts associated with one or more other document portions of the document;
   determining one or more first probabilities of the one or more document portions matching the predicted intent based on the one or more first concepts and one or more second probabilities of the one or more other document portions matching the predicted intent based on the one or more second concepts;
   in response to detecting negative feedback related to the first response, that was generated based on the predicted intent, in connection with one or more second user inputs following the first response, selecting, for presentation via the chat interface, the one or more document portions of the document over the one or more other document portions based on the one or more first probabilities of the one or more document portions matching the predicted intent being greater than the one or more second probabilities of the one or more other document portions matching the predicted intent; and
   presenting the one or more document portions of the document via the chat interface.

2. The system of claim 1, wherein the prediction model comprises one or more neural networks configured to take content of the document as input.

3. A method comprising:
   obtaining a first user input of a user via a chat interface;
   determining a predicted intent of the user based on the first user input;
   generating, via the chat interface, a first response related to the first user input based on the predicted intent;
   obtaining, via a prediction model, concepts associated with a document, the concepts comprising one or more first concepts associated with one or more document portions and one or more second concepts associated with one or more other document portions of the document;
   determining one or more first probabilities of the one or more document portions matching the predicted intent based on the one or more first concepts and one or more second probabilities of the one or more other document portions matching the predicted intent based on the one or more second concepts; and in response to detecting negative feedback related to the first response in connection with one or more second user inputs following the first response, providing the one or more document portions of the document via the chat interface, wherein the one or more document portions of the document are selected for presentation via the chat interface over the one or more other document portions based on the one or more first probabilities of the one or more document portions being greater than the one or more second probabilities of the one or more other document portions.

4. The method of claim 3, wherein the prediction model comprises one or more neural networks configured to take content of the document as input.

5. The method of claim 3, wherein providing the one or more document portions comprises presenting, based on the selection of the one or more document portions, an image depicting the one or more document portions.

6. The method of claim 3, wherein providing the one or more document portions comprises:
presenting the document via the chat interface; and
emphasizing, based on the selection of the one or more document portions, the one or more document portions over the one or more other document portions of the document during the presentation of the document.

7. The method of claim 3, further comprising:
performing sentiment analysis monitoring on the one or more second user inputs to detect a negative sentiment in connection with the one or more second user inputs,
wherein providing the one or more document portions comprises providing the one or more document portions of the document via the chat interface in response to detecting the negative sentiment in connection with the one or more second user inputs.

8. The method of claim 3, further comprising:
in response to detecting the negative feedback related to the first response, presenting a graphical user interface element in the chat interface for facilitating the user to upload a specified document.

9. The method of claim 3, further comprising:
obtaining metadata of each of a plurality of documents associated with the user based on content extracted from each of the plurality of documents, and
obtaining the document from the plurality of documents based on metadata of the document matching the predicted intent.

10. The method of claim 3, wherein determining the predicted intent comprises:
obtaining an intent set using at least one prediction model, wherein each predicted intent of the intent set is associated with a probability of matching a current intent of the user, and
selecting the predicted intent from the intent set based on the predicted intent being associated with a higher probability than other predicted intents of the intent set.

11. The method of claim 3, further comprising:
generating the document based on a plurality of documents associated with the user.

12. One or more non-transitory computer-readable media comprising instructions that, when executed by one or more processors, cause operations comprising:
obtaining a first user input of a user via a user interface;
determining a predicted intent of the user based on the first user input;

generating, via the user interface, a first response related to the first user input based on the predicted intent;
obtaining, via a prediction model, concepts associated with a document, the concepts comprising one or more first concepts associated with one or more document portions and one or more second concepts associated with one or more other document portions of the document;
determining one or more first probabilities of the one or more document portions matching the predicted intent based on the one or more first concepts and one or more second probabilities of the one or more other document portions matching the predicted intent based on the one or more second concepts; and
in response to detecting negative feedback related to the first response in connection with one or more second user inputs following the first response, providing the one or more document portions of the document via the user interface,
wherein the one or more document portions of the document are selected for presentation via the user interface over the one or more other document portions based on the one or more first probabilities of the one or more document portions being greater than the one or more second probabilities of the one or more other document portions.

13. The media of claim 12, wherein the prediction model comprises one or more neural networks configured to take content of the document as input.

14. The media of claim 12, wherein providing the one or more document portions comprises presenting, based on the selection of the one or more document portions, an image depicting the one or more document portions.

15. The media of claim 12, wherein providing the one or more document portions comprises:
presenting the document via the user interface; and
emphasizing, based on the selection of the one or more document portions, the one or more document portions over the one or more other document portions of the document during the presentation of the document.

16. The media of claim 12, the operations further comprising:
performing sentiment analysis monitoring on the one or more second user inputs to detect a negative sentiment in connection with the one or more second user inputs,
wherein providing the one or more document portions comprises providing the one or more document portions of the document via the user interface in response to detecting the negative sentiment in connection with the one or more second user inputs.

17. The media of claim 12, the operations further comprising:
in response to detecting the negative feedback related to the first response, presenting a graphical user interface element in the user interface for facilitating the user to upload a specified document.

18. The media of claim 12, the operations further comprising:
obtaining metadata of each of a plurality of documents associated with the user based on content extracted from each of the plurality of documents, and
obtaining the document from the plurality of documents based on metadata of the document matching the predicted intent.

19. The media of claim 12, wherein determining the predicted intent comprises:

obtaining an intent set using at least one prediction model, wherein each predicted intent of the intent set is associated with a probability of matching a current intent of the user, and selecting the predicted intent from the intent set based on the predicted intent being associated with a higher probability than other predicted intents of the intent set.

20. The media of claim 12, the operations further comprising:

generating the document based on a plurality of documents associated with the user.

\* \* \* \* \*